United States Patent [19]

Kanamaru et al.

[11] Patent Number: 5,114,263
[45] Date of Patent: May 19, 1992

[54] JOINT HAVING BALL AND SHAFT COUPLED THROUGH PLASTIC DEFORMATION

[75] Inventors: Hisanobu Kanamaru; Tomiyasu Onuma; Kazushi Sasaya, all of Katsuta, Japan

[73] Assignee: Hitachi, Ltd., Tokyo, Japan

[21] Appl. No.: 705,552

[22] Filed: May 24, 1991

Related U.S. Application Data

[63] Continuation of Ser. No. 810,299, Dec. 18, 1985, abandoned.

Foreign Application Priority Data

Dec. 25, 1984 [JP] Japan ............... 59-278782
Dec. 25, 1984 [JP] Japan ............... 59-278783

[51] Int. Cl.⁵ .................................. G25G 3/28
[52] U.S. Cl. ................................... 403/274; 403/242; 29/522.1
[58] Field of Search ............. 403/274, 282, 284, 285, 403/242, 248, 249, 277, 279; 29/522.1, 522 R, 520, 511; 123/193 P, 58 R, 58 B, 58 BA, 197 A, 197 AB; 417/269; 91/499

[56] References Cited

U.S. PATENT DOCUMENTS

| 501,983 | 7/1893 | Worron | 123/58 BA |
|---|---|---|---|
| 913,618 | 2/1909 | Butler | 403/242 X |
| 1,275,576 | 8/1918 | Lockwood | 403/284 X |
| 1,315,538 | 9/1919 | Burtnett | 123/58 BA |
| 1,410,520 | 3/1922 | Taylor | 417/269 |
| 3,018,737 | 1/1962 | Cook et al. | 417/269 X |
| 3,257,855 | 6/1966 | Dangauthier | 123/58 R |
| 3,468,007 | 9/1969 | Nakamura |  |
| 3,820,579 | 6/1974 | Barry | 403/242 X |
| 4,012,795 | 3/1977 | Dorre et al. |  |
| 4,175,915 | 11/1979 | Black et al. | 417/269 X |
| 4,270,255 | 6/1981 | Klimek |  |
| 4,329,768 | 5/1982 | Tranberg et al. | 29/520 X |
| 4,370,793 | 2/1983 | Kanamaru et al. | 403/274 X |
| 4,458,414 | 7/1984 | Aultman et al. | 29/522 R |

FOREIGN PATENT DOCUMENTS

| 1501223 | 10/1967 | France |  |
|---|---|---|---|
| 2388636 | 12/1978 | France | 403/274 |
| 55-94740 | 7/1980 | Japan | 403/274 |
| 963377 | 7/1980 | Japan | 417/269 |
| 1359366 | 7/1974 | United Kingdom | 29/522 |
| 2016979 | 9/1979 | United Kingdom | 29/522 R |

Primary Examiner—Andrew V. Kundrat
Attorney, Agent, or Firm—Antonelli, Terry, Stout & Kraus

[57] ABSTRACT

A joint structure for bonding a ball portion and a shaft portion, with the ball including a mounting hole bored toward a center thereof. A corrugated surface for effecting the bonding is formed in an inner circumferential surface of the mounting hole. A shaft portion, of a softer material than the ball portion, is fitted into the mounting hole of the ball portion. An outer circumferential portion of the shaft portion is plastically locally deformed in the vicinity of a corrugated surface of the mounting hole with the ball portion and the shaft portion being are bonded to each other with a tightening force.

1 Claim, 3 Drawing Sheets

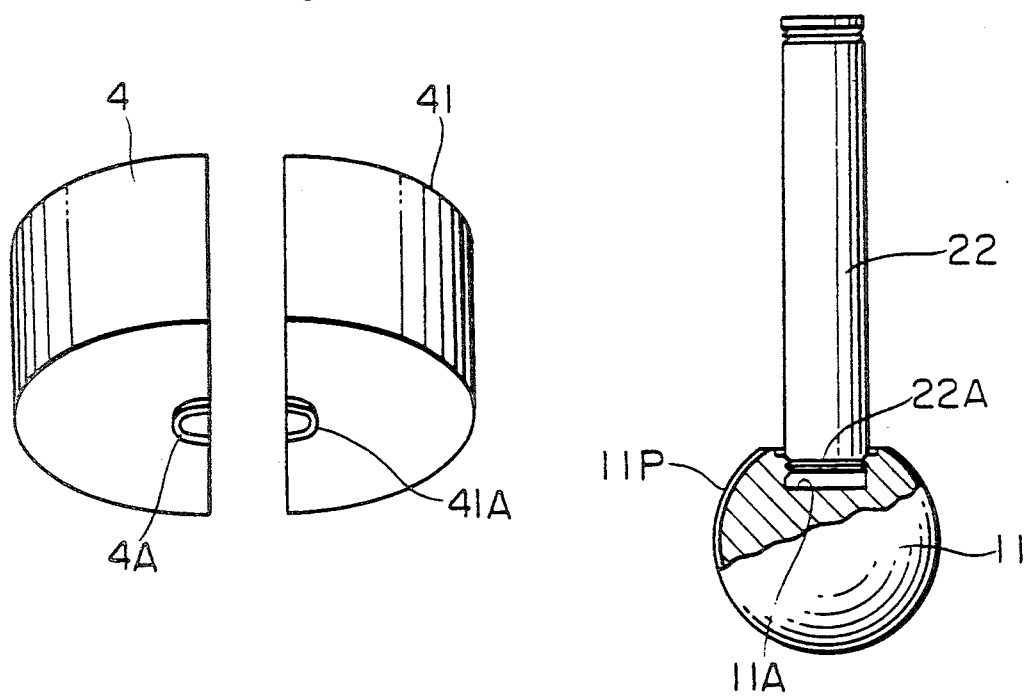
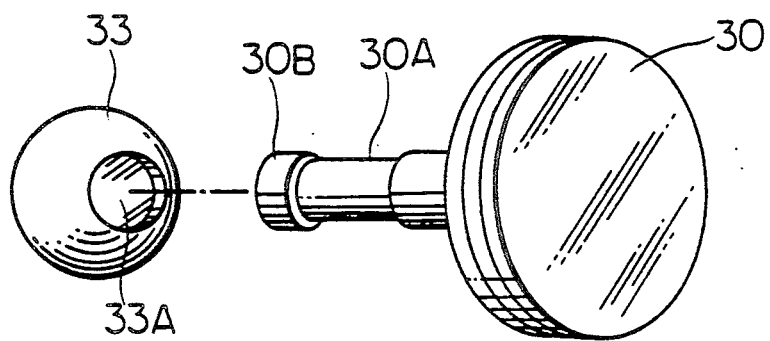

JOINT HAVING BALL AND SHAFT COUPLED THROUGH PLASTIC DEFORMATION

This is a continuation of application Ser. No. 810,299 filed Dec. 18, 1985 now abandoned.

BACKGROUND OF THE INVENTION

The present invention relates to a joint having a ball and a shaft which are coupled to each other through plastic deformation and more particularly to a joint having a ball and a shaft suitable for a ball joint used in an internal combustion engine or a piston mechanism.

In, for example, Japanese Patent Publication 96377/86 a piston mechanism has been widely used in, for example, an automotive compressor includes a piston portion reciprocating within a cylinder and a piston rod for mechanically connecting the piston portion and a swash drive plate to each other.

In such a structure, almost all of piston rods are of the spherical head couple type and are made of steel since the piston rods are used mainly for reciprocating motion. Such spherical head couple type piston rods have been usually cast as one-piece elements or the ball and shaft portions have been made separately and bonded to each other through a weld technique; however, no processes other than casting and postbonding have been proposed. However, cast piston rods must be ground in a post process, thereby reducing production efficiency and economy. Also, in bonding the ball portions and the shaft portion, it is very difficult to obtain a satisfactory mechanical accuracy, which would lead to an increase in cost.

In a method of separately forming the ball and the shaft portions and bonding them by welding, although it is easy to form the respective ball and shaft portions, it is very difficult to obtain a satisfactory mechanical accuracy as in the former case and, consequently, this method is not suitable for mass-production. Moreover, even if the shaft is made of light metal such as aluminum for reducing its weight, present welding techniques cannot offer a reliable bond between the aluminum material and iron material and, consequently, are not practical use.

The avoid the above-noted disadvantages, an object of the present invention resides in providing a joint having a ball and a shaft, which is superior in mass-production with a high mechanical accuracy.

The present invention provides a joint in which a shaft is inserted into a mounting hole formed in a ball so that either of the shaft and a fitting peripheral portion of the ball is locally plastically deformed, thus bonding the shaft to the mounting hole with a tightening force.

With a structure wherein the shaft and the ball receiving the shaft are bonded to each other by local plastic deformation, it is possible to manufacture the joint with a simple pressing process. Therefore, it is possible to provide the joint, having the ball and shaft, that has a high accuracy and is capable of mass-production.

BRIEF DESCRIPTION OF THE DRAWINGS

FIG. 3 is a perspective view of press dies shown in FIG. 2;

FIG. 4 is a fragmentary partial cross-sectional elevational view showing a bonded state of a ball portion and a shaft portion in accordance with another embodiment of the invention;

FIG. 6 is an exploded perspective view of the bond shown in FIG. 5.

DETAILED DESCRIPTION

Figure 1:
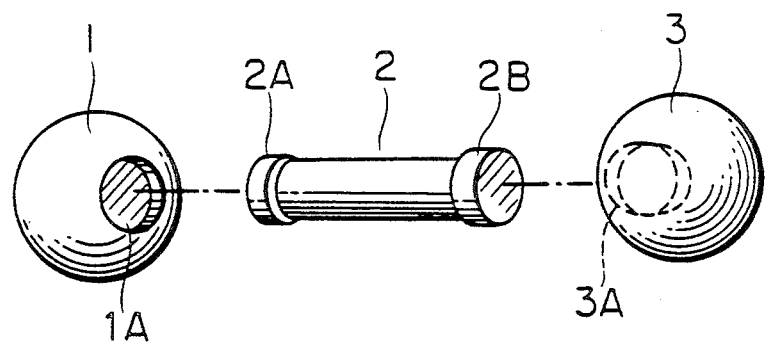
FIG. 1 is an exploded perspective view of a joint of ball portion and a shaft portion in accordance with an embodiment of the invention.

Referring now to the drawings, wherein like reference numerals are used throughout the various views to designate like parts and, more particularly, to FIG. 1, according to this figure, a bonded structure between ball portions 1 and a shaft portion 2 of a piston mechanism of an automotive compressor and a method for coupling the same is proposed wherein a ball portion, made of steel includes a mounting hole 1A having a depth of several mm from an outer periphery toward a center thereof and a diameter of the hole 1A is substantially equal to an outer diameter of an end 2A of a shaft portion 2 so that the shaft end 2A may be fitted into the hole 1A. Because the structure of the bond is of the head couple type, the shaft portion 2 has a like ball portion 3 at the opposite end thereof so that the opposite end 2B of the shaft portion 2 may be fitted into a mounting hole 3A in the same manner.

The mounting holes 1A and 3A to be formed in the ball portions 1 and 3 are worked by mechanical cutting with a lathe or the like. In an inner surface of the hole 1a, at its intermediate portion, there is formed an annular groove 1B having a W-shape in cross-section. Then, the end 2A of the shaft 2 is fitted into the mounting hole 1A so that its outer circumferential portion is plastically locally deformed with the annular groove 1B, thus firmly bonding the ball portions 3 and the shaft portion 2 with a tightening force generated around the annular groove 1B.

Figure 2:
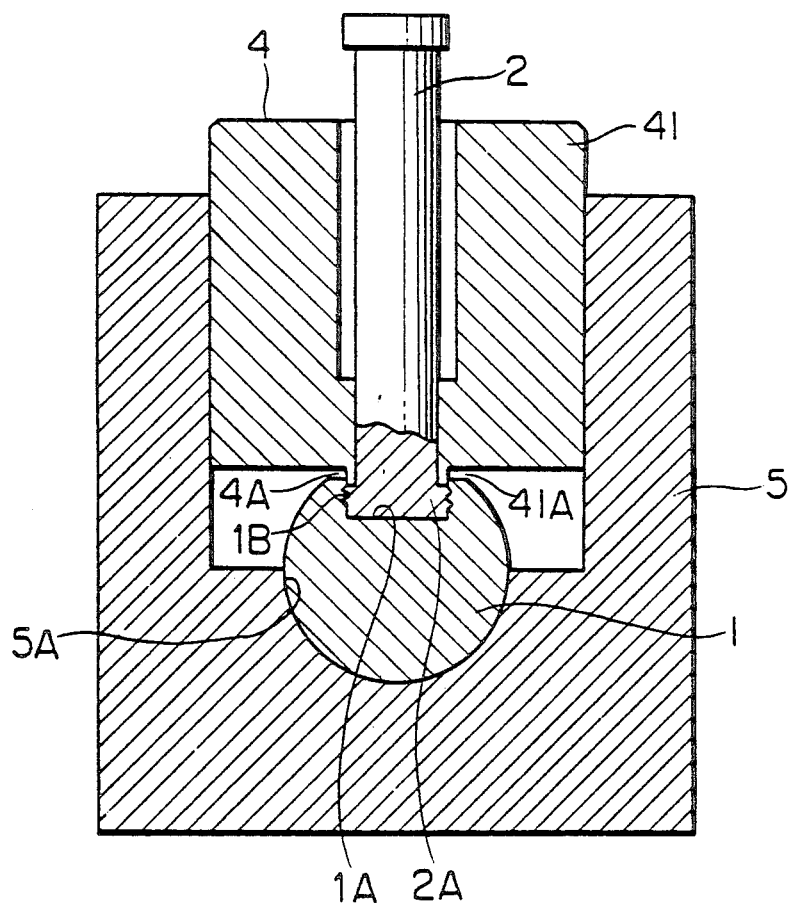
FIG. 2 is a longitudinal cross-sectional view of a bonding process of the ball and shaft portions shown in FIG. 1.

As shown most clearly in FIG. 2, after the shaft 2 has been clamped by a pair of hollow dies 4 and 41 as shown in FIG. 3, the mounting hole 1A of the ball portion 1 is fitted to the end 2A of the shaft portion 2. Then, these assembling components are inserted in unison into a receiving die 5 having a cylindrical shape. On the other hand, in the central portion of a bottom of the receiving die 5, there is formed a hole 5A having a spherical shape which is the same as the spherical shape of the ball portion 1 with the ball portion 1 is received by the hole 5A.

Male teeth 4A, 41A are formed at a circumferential portion of lower end faces of the dies 4 and 41 along inner peripheral portions thereof and are arranged to occupy a gap between an inner peripheral portion of the mounting hole 1A of the ball portion 1 and the outer peripheral portion of the shaft portion 2. As apparent from FIG. 1, an outer diameter of the shaft portion 2, except for the ends 2A and 2B, is smaller than a diameter of the mounting holes 1A and 3A, in the state where the end 2A of the shaft portion 2 is inserted into the mounting hole 1A, confronting surfaces for the male teeth 4A, 41A are defined on the upper vertical surface of the end 2A of the shaft portion 2. The bond between the ball portion 1 and the shaft 2 is made by simultaneously lowering the dies 4 and 41 with a peripheral end face of the end 2A of the shaft portion 2 being pressed vertically by the male teeth 4A, 41A. Then, the locally compressed material will be locally fluidized normal to the compression direction, that is, in a direction toward the annular W-shaped groove 1B and will be firmly bonded with a tightening force at the projected portions formed by the annular W-shaped groove 1B.

After the bonding has been completed, the bonded shaft portion 2 is removed together with the press dies 4, 41 and the press dies 4, 41 are opened. Then, the other ball portion 3 is bonded to the shaft portion 2 in the same working order.

The thus obtained piston structure is avaiable in case where different material metals should be bonded to each other. It is possible to bond a ball portion 3 and a shaft portion 2 which are made of any desired metal, thereby enabling a weight reduction of the piston structure.

Also, the mounting hole 1A formed in the ball portion 1 is directed to the center axis, the shaft portion 2 is inserted thereat and the end of the shaft portion 2 is coaxially pressed and bonded by the press dies 4, 41, so that a manufacturing accuracy and a mass-production are ensured. With respect to the bonding method, the member made of softer material is to be deformed in a plastic manner through cold press, and the method does not depend on the material. The method may be carried out very effectively. Although, in the above-described embodiment, the annular W-shaped groove 1B is formed in an inner surface of the mounting hole 1A of the ball 1, instead thereof, an electric discharge work may be applied to the surface to roughen it. Also, in the case where the mounting hole is formed by cutting work, the roughness caused by cutting work may be often satisfactory. However, as a higher mechanical strength is desired, it is preferable to form the groove while cutting the hole.

Furthermore, although the bond described above is one between the steel and aluminum being applied to the spherical head couple structure, only one of the heads may be spherical and the bond between the steel member and the steel member may be carried out. However, it is preferable that, in the steel-to-steel bond, the mounting hole be subjected to a carburizing process to be hardened. This process is simple and effective.

In the bond structure of FIG. 4, the ball portion 11 is plastically deformed for bonding to a shaft portion 22. In this case, it is possible to bond soft steels to each other, which is much superior in production efficiency to the cutting work.

The ball portion 11 is made of soft steel and is subjected at its outer periphery to the carburizing process to form a hard surface 11p of about 0.3 mm. A mounting hole 11A, as in the previously described embodiment is formed in the central area of the ball portion 11 and fits the end of the shaft portion 22. With an annular W-shaped groove 22A formed in advance in the end of the shaft portion 22, a material constituting the ball 11 is locally plastically deformed as in the previously described embodiment. Accordingly, it is unnecessary to make the ball portion 11 from an expensive hard material and to work the end for bonding the ball portion 11 and shaft portion 22.

Figure 5:
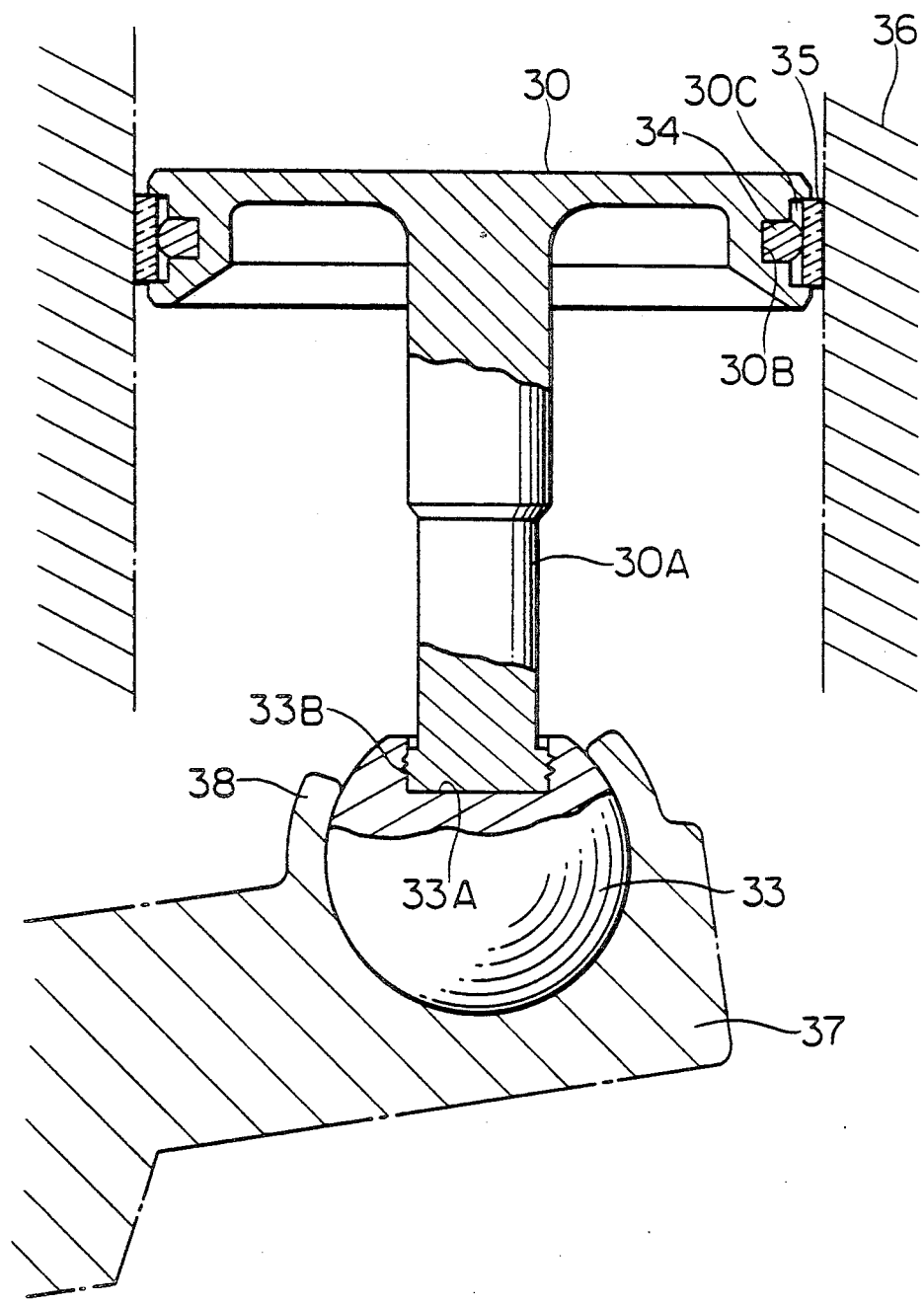
FIG. 5 is a fragmentary partial cross-sectional view of the present invention as applied to a bond between a piston and a piston rod for an automotive air-conditioner compressor.

In the embodiment of FIGS. 5 and 6, a piston portion, having a disc-shape, is made of light metal such as pure aluminum or an aluminum alloy. The central portion of the piston structure is formed integral by cold working or the like. The piston structure has a piston rod 30A suspending therefrom in the form of a T-shape in cross-section.

The ball portion 33 is usually made of steel and is provided through a cutting work or the like with a mounting hole 33A that has a depth of several mm directed to the center thereof and is substantially equal to an outer diameter of the end 30B of the piston rod 30A. In the inner circumferential surface, there is formed an annular W-shaped groove 33B. The end of the piston rod 30A is fitted into the mounting hole 33A. The outer circumferential portion of the end of the rod 30A is plastically locally deformed with the annular groove 33B to thereby firmly bond the two components with a tightening force exerted to the circumferential surface of the annular groove 33B.

An annular groove 30B, for receiving receive a resilient ring 34, and another annular groove 30C receiving a seal 35, are formed stepwise in an outer circumferential surface of the piston portion 30. The resilient ring 34 causes the seal 35 to be normally in sliding contact with an inner circumferential surface of a cylinder 36. On the other hand, the spherical ball portion 33 is rotatably arranged in an outer portion of a swash plate 37 but is prevented from being displaced out of the swash plate 37 by a stop member 38 formed on the swash plate 37.

In the thus constructed piston mechanism, all components except for the ball portion 33 may be made of light material having a small specific weight. The total weight may be reduced to about one third of that of the conventional piston mechanism in which the piston rod is made of steel.

This reduction in weight enables the making of the piston rod from light metal and dispenses with the necessity to bond the piston portion 30 and the piston rod 30A to each other. Also, it is unnecessary to elongate the piston than required for obtaining a satisfactory bonding strength.

In the piston mechanism of FIG. 5, piston mechanism is reciprocated in the axial direction within the cylinder 36 and is rotated in synchronism with the cylinder 36 and the swash plate 37. However, since the piston portion 30 is made of very light metal, a mechanical inertia of the piston portion due to the centrifugal force may be made very small and a load imposed on the seal 35 may be moderated, thus considerably prolonging a service life of the seal 35.

As described above, the cylinder rotary swash-plate type compressor is largely influenced by the weight of the piston. Therefore, such a compressor has not been widely used although it has various advantages. According to the invention, a problem of weight may be resolved.

In the embodiment of FIG. 5, the annular W-shaped groove 33B is formed in the inner circumferential surface of the mounting hole 33A of the ball 33. However, instead thereof, an electric discharge work may be applied to roughen the surface and in the case where the mounting hole is made by cutting work, the cutting roughness may suffice in some cases. However, if a higher strength is required, it is desirable to form the groove while cutting the surface.

We claim:

1. A joint having a harder ball portion and a piston rod, the joint comprising:
    a blind mounting hole bored toward a center of said ball portion;
    a corrugated surface means formed in an inner circumferential surface of said mounting hole for forming a bond between said harder ball portion and said piston rod; said piston rod being inserted into said mounting hole and being made of a softer material than said ball portion and including at one end thereof a piston portion;

wherein a outer circumferential portion of said piston rod is plastically locally deformed in a vicinity of said corrugated surface means so as to bond said ball portion and said piston rod to each other with a tightening force caused by plastic deformation of said outer circumferential portion of said piston rod into said corrugated surface means formed in the inner circumferential surface of said mounting hole, and wherein said piston rod and said piston portion are integrally formed of an aluminum material, and an end of said piston rod is plastically deformed in said mounting hole.

* * * * *